(12) United States Patent
Fugit

(10) Patent No.: US 7,046,125 B2
(45) Date of Patent: May 16, 2006

(54) RACING VEHICLE POSITION INDICATION SYSTEM AND METHOD

(76) Inventor: David K. Fugit, 35 Forest Ridge Ct., Fishers, IN (US) 46038

( * ) Notice: Subject to any disclaimer, the term of this patent is extended or adjusted under 35 U.S.C. 154(b) by 124 days.

(21) Appl. No.: 10/703,753

(22) Filed: Nov. 7, 2003

(65) Prior Publication Data

US 2004/0095228 A1    May 20, 2004

Related U.S. Application Data

(60) Provisional application No. 60/424,422, filed on Nov. 7, 2002.

(51) Int. Cl.
*G08B 23/00* (2006.01)

(52) U.S. Cl. ............... 340/323 R; 340/463; 340/468; 342/457; 362/459; 362/487; 362/493

(58) Field of Classification Search ............ 340/323 R, 340/441, 539.1, 539.13, 471, 466, 473, 485, 340/988, 425.5, 463, 468; 388/2; 362/459, 362/487, 493; 342/457
See application file for complete search history.

(56) References Cited

U.S. PATENT DOCUMENTS

| | | | | |
|---|---|---|---|---|
| 3,795,907 A | * | 3/1974 | Edwards | 340/323 R |
| 3,981,002 A | | 9/1976 | Gardner | |
| 4,449,114 A | | 5/1984 | Fascenda et al. | |
| 4,785,282 A | * | 11/1988 | Martell et al. | 340/323 R |
| 4,999,604 A | * | 3/1991 | Crews | 340/323 R |
| 5,241,487 A | | 8/1993 | Bianco | |
| 5,511,045 A | * | 4/1996 | Sasaki et al. | 368/2 |
| 5,816,913 A | | 10/1998 | Nakamura | |
| 5,867,089 A | * | 2/1999 | Zyburt et al. | 340/323 R |
| 5,946,635 A | | 8/1999 | Dominguez | |
| 5,983,161 A | | 11/1999 | Lemelson et al. | |
| 6,020,851 A | * | 2/2000 | Busack | 342/457 |
| 6,275,773 B1 | | 8/2001 | Lemelson et al. | |
| 6,411,205 B1 | * | 6/2002 | Reid | 340/468 |

FOREIGN PATENT DOCUMENTS

| | | |
|---|---|---|
| JP | 2676710 B2 | 11/1997 |
| JP | 2690676 B2 | 12/1997 |

OTHER PUBLICATIONS

"The Lights", American Le Mans Series Media Guide, 2003, p. 14, American Le Mans Series.
"Follow The Lights", American Le Mans Series flyer.
"Follow the Lights—Follow the Action", 2004, Sebring International Raceway Guest Guide, pp. 2-3, 18-19, Sebring International Raceway.

\* cited by examiner

*Primary Examiner*—Davetta W. Goins
(74) *Attorney, Agent, or Firm*—Woodard, Emhardt, Moriarty, McNett & Henry LLP

(57) ABSTRACT

A system for indicating race position to spectators of a race, includes lights on the race participants that are configured to provide visual displays to the spectators indicating the position of the respective racer. The race participants also carry a receiver and a controller for receiving a signal indicating race position and selecting the appropriate visual display based on the received signal. The visual display can be a series of lights, such as linear arrays of LEDs, where the color, number, pattern and/or position of the lights indicates race position. The system can also be used to highlight selected racers of interest, for example in conjunction with information being relayed over the public address system of the racetrack.

33 Claims, 7 Drawing Sheets

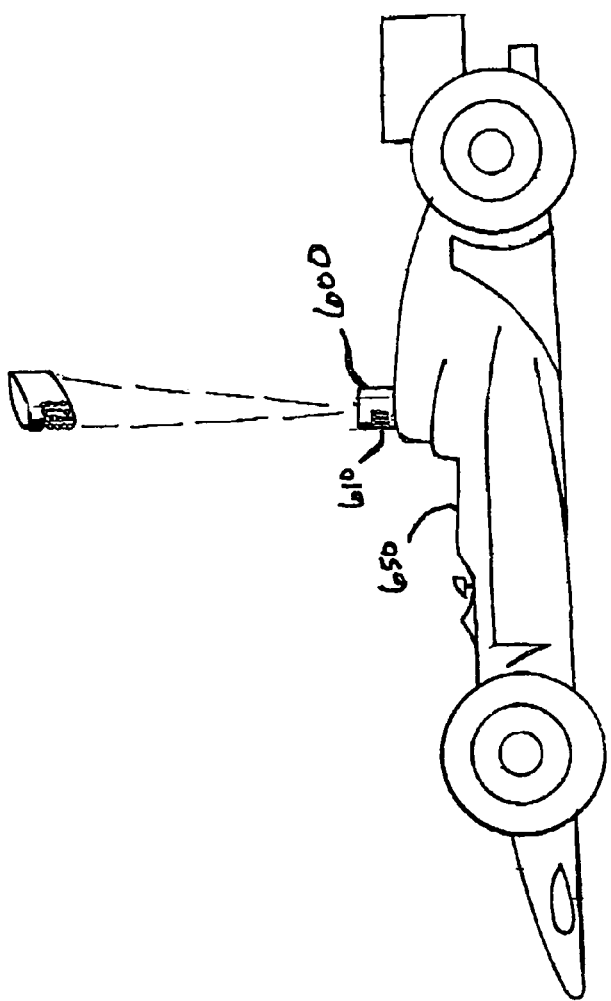
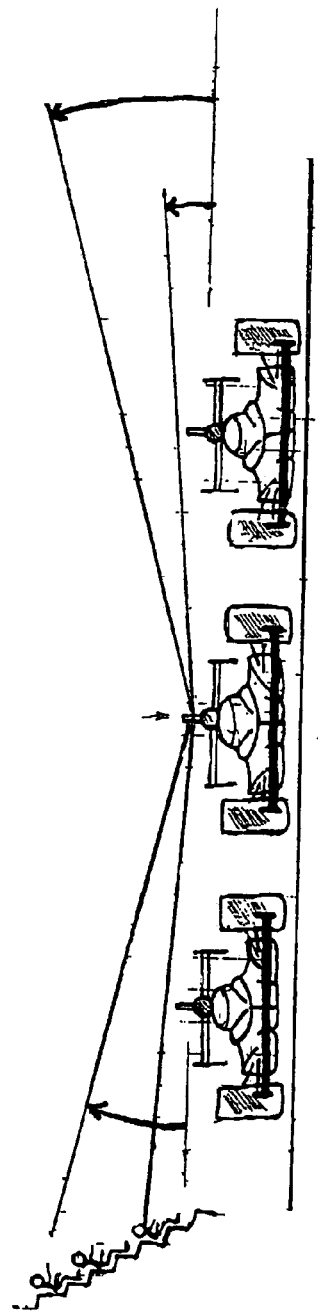
Fig. 7
Fig. 8

RACING VEHICLE POSITION INDICATION SYSTEM AND METHOD

RELATED APPLICATIONS

This application claims the benefit of U.S. Provisional Application Ser. No. 60/424,422, filed Nov. 7, 2002, the disclosure of which is incorporated by reference.

FIELD OF THE INVENTION

The present invention relates generally to a system and method for indicating the current position in the field of a racecar and more specifically to indicators allowing spectators to discern a particular car's position in the field without having to divert their attention from the race.

BACKGROUND OF THE INVENTION

Automobile racing has become one of the most popular spectator sports in the world. Formal automobile racetracks range from small, dirt covered ovals to large, paved surfaces more than a mile in length. These races often require the competitors to complete multiple laps around the track and frequently require pit stops for refueling and repairs during the race.

The length of races and necessity of pit stops often makes it difficult for spectators to determine which car is leading a race at any given moment. As opposed to single-lap races where the leading car is always at the front of the pack, in multiple-lap races the car leading the field may actually be located in the middle or rear of the pack at any given moment due to pit stops or coming up behind slower cars. This inability to determine a particular car's current position in the field leads to frustration, especially in the casual fan. This also requires spectators to pay attention to the race at all times so as not to loose track of which car is currently in the lead.

Previous attempts to solve this problem have utilized some type of leader board to display each car's current position in the field. This board is either electronically or manually updated to indicate each car's current position as the race progresses. One disadvantage of this solution, however, is that it requires spectators to look away from the race to view the board. Another disadvantage of this solution is that it requires the construction and maintenance of multiple boards at various locations around a track so that all spectators maybe within viewing distance of a board. At larger race venues this can become quite expensive.

The present invention is directed towards overcoming the problems set forth above.

SUMMARY OF INVENTION

One object of the present invention is to provide a position indicating system and method for visually indicating a racing vehicle's current position in the field.

Another object of the present invention is to provide a position indicating system and method for visually indicating a racing vehicle's current position in the field which automatically updates each vehicle's position in the field as the race progresses.

A further object of the present invention is to provide a position indicating system and method for visually indicating a racing vehicle's current position in the field which is easily retrofitted to existing racing vehicles and racetracks.

Yet another object of the present invention is to provide a position indicating system and method for visually indicating a racing vehicle's current position in the field which is operated automatically by a racetrack's existing timing system.

Further objects, embodiments, forms, benefits, aspects, features and advantages of the present invention may be obtained from the description, drawings, and claims provided herein.

BRIEF DESCRIPTION OF THE DRAWINGS

FIG. 7 is a side view of an open wheel racecar according to the present invention where the position indicator is incorporated in the camera pod.

FIG. 8 is a front view of a racetrack with the open wheel racecar of FIG. 7

DESCRIPTION OF THE PREFERRED EMBODIMENT

Figure 1:
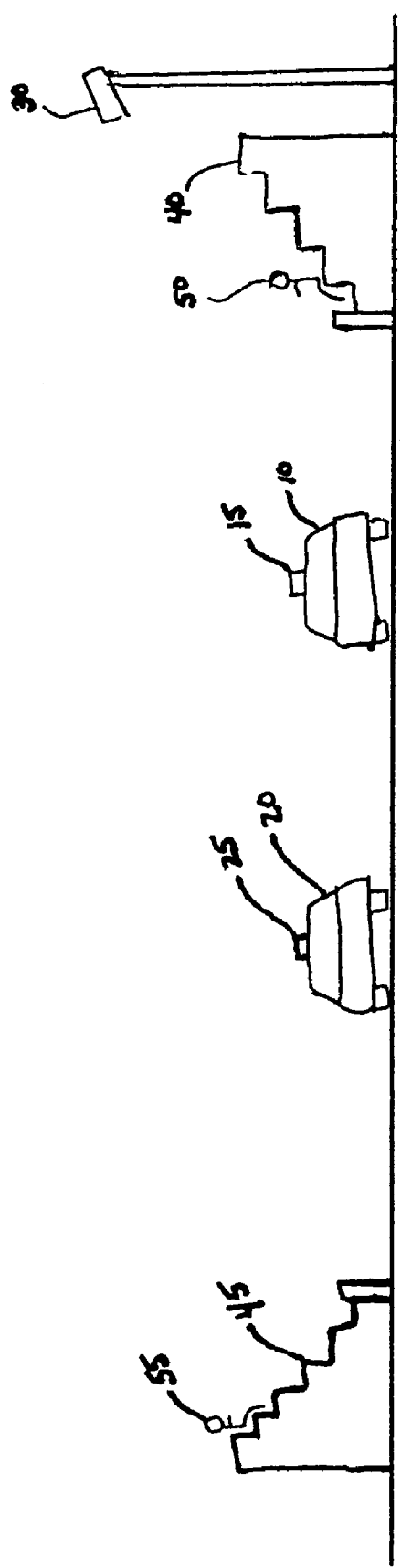
FIG. 1 is a rear view of a racetrack employing the present invention.

For the purposes of promoting understanding of the principles of the invention, reference will now be made to the embodiment illustrated in the drawings and specific language will be used to describe the same. It will nevertheless be understood that no limitation of the scope of the invention is hereby intended and alterations and modifications in the illustrated device, and further applications of the principles of the present invention as illustrated herein being contemplated as would normally occur to one skilled in the art to which the invention relates.

The present invention relates to a system and method for visually indicating a racing vehicle's current position in a field of vehicles during a race. To aid in the explanation of the present invention, the following description will refer only to racecars. This is for illustrative purposes only and is not a limitation on the scope of the present invention. It is understood that the present invention may be practiced with all types of racecars as well as other racing vehicles such as motorcycles and go-karts.

In one embodiment of the present invention each car in the field of participants is equipped with a position indicating unit and the track is equipped with at least one transmission unit. The position indicating units may be mounted at a variety of locations on the cars using screws, welding, magnets, hook and loop fasteners (i.e. VELCRO) adhesives or any other suitable attachment means. The units may be permanently mounted to each vehicle, incorporated by design into the vehicle itself, or removably mounted so that a single unit may be used by different vehicles participating in separate races. Preferably the position indicating units are mounted such that they are easily visible by race spectators but are not easily visible by race participants. A device designed to deflect airflow around the position indicating unit thereby reducing drag may optionally be mounted to each car. Alternatively, the position indicating unit may be aerodynamically shaped so as to minimize drag.

Each position indicating unit includes a visual indicator, a control unit and a receiver. Optionally, each unit may also include a power source such as a battery. Alternatively or in addition, each unit may be powered by the car's electrical system.

A variety of devices may be used as a visual indicator. In one embodiment, the visual indicator is at least one light capable of being illuminated so as to display a variety of different colors to the spectators. This maybe accomplished, for example, by placing a plurality of different colored lights inside a single transparent housing and illuminating the color desired. Alternatively this may be accomplished by providing a plurality of different colored screens or films which may be interposed between a white light source and the spectators. In this particular embodiment, a car's current position in the field may be indicated by the color of light illuminated by the visual indicator. For example, a red light might indicate a car is in first place while a green light might indicate a car is currently running second.

In another embodiment, the visual indicator is a bank of distinct lights which may be of the same or different colors. In this particular embodiment, position may be indicated by the color of the light illuminated in the case of a bank of lights which are different colors. Alternatively or in addition, the number or position of illuminated lights in the bank of distinct lights may be used to indicate the position of the car. For example, even if all of the lights in a bank were of a single color, position can be clearly indicated to the spectators by the number of lights illuminated (e.g. two lights indicates the car in second place, four lights indicates the car in fourth place). Alternatively or in addition, race position can be indicated by the position of the light illuminated. For example, position indicator lights can be provided at different locations on the car, with a light in a particular location designating a particular race position, according to any prearranged scheme (e.g. a light on the left front is first place, the right front is second place, on the roof is third place, etc.).

When light is employed as the visual indicator, for example by its color, position and/or number as described above, a variety of light sources may be employed such as incandescent bulbs, light-emitting diodes (LED), fluorescent bulbs or any other suitable light producing device. In one form, the light is sufficiently bright to be seen by those spectators at the track that are positioned a distance from the cars, in many cases over 100 or over 1000 feet away.

In yet another embodiment, the visual indicator is a display panel such as a liquid crystal display (LCD). Other suitable types of display panels capable of displaying alphanumeric information may also be used. In this embodiment, a car's current position in the field maybe displayed as a number, letters, or a combination of numbers and letters.

The control unit and receiver of the position indicating device maybe separate devices or consolidated into a single device capable of performing both functions. The receiver is capable of receiving a signal transmitted by one or more transmission devices located around the racetrack. The receiver and transmission devices may operate using laser light, radio frequencies, infrared or some other suitable electromagnetic frequency such as microwaves. Preferably the receivers and transmission devices are operated on a frequency not typically used by cellular phones or other consumer electronics likely to be used at or near a racetrack so these devices do not interfere with the operation of the system. When the receiver receives a positional signal from a transmission device, the receiver passes this signal to the control unit. The control unit then commands the visual indicator to display the light corresponding to the car's current position in the field. For example, in a system using an LCD screen as previously described, the control unit might instruct the LCD screen to display a "1" to indicate the car had moved into the lead.

At least one transmission unit is located near the racetrack for transmitting position information to the indicating units on the cars. While it need only be able to communicate with the cars at a single location on the track (e.g. as they cross the start-finish line), the transmission unit is preferably configured such that it can signal a car at virtually any position on the track. This may be accomplished using a single unit which is centrally located or several units disposed at various positions around the track and electronically linked together. The transmission unit may transmit information using laser, radio frequencies, or any other suitable frequency. The transmission units may be operated manually from a control panel. Alternatively, the transmission units are electronically controlled by a racetrack's existing electronic timing system such that as soon as the timing system detects a position change, the transmission units automatically transmit position signals to the position indicating units to display the correct positional information. Alternatively, the transmission units may be electronically linked to a racetrack's leader board display system such that when a position change is indicated on the leader board the position indicating units are updated accordingly.

In one embodiment of the present invention, the transmission units and visual indicating units are easily retrofittable to existing vehicles and racetracks. In another embodiment, the transmission units and visual indicating units are portable such that a single set of units may be transported and used at multiple race locations.

FIG. 1 shows a rear view of two racecars 10, 20, passing by two grandstands 40, 45 and a transmission unit 30. The transmission unit is shown atop a pole, however, transmission units may be located at any convenient position about a racetrack where they are capable of transmitting a signal to each visual indicator unit 15, 25. Preferably, the visual indicator units are visible by spectators 50, 55 but not easily visible by drivers.

Figure 2:
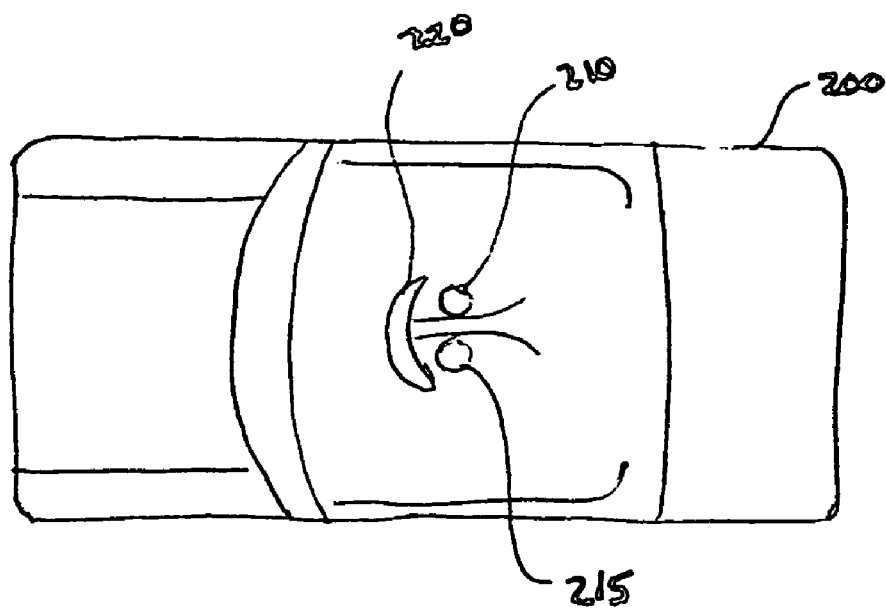
FIG. 2 is a top plan view of a racecar equipped with a position indicator according to one embodiment of the present invention.
Figure 3:
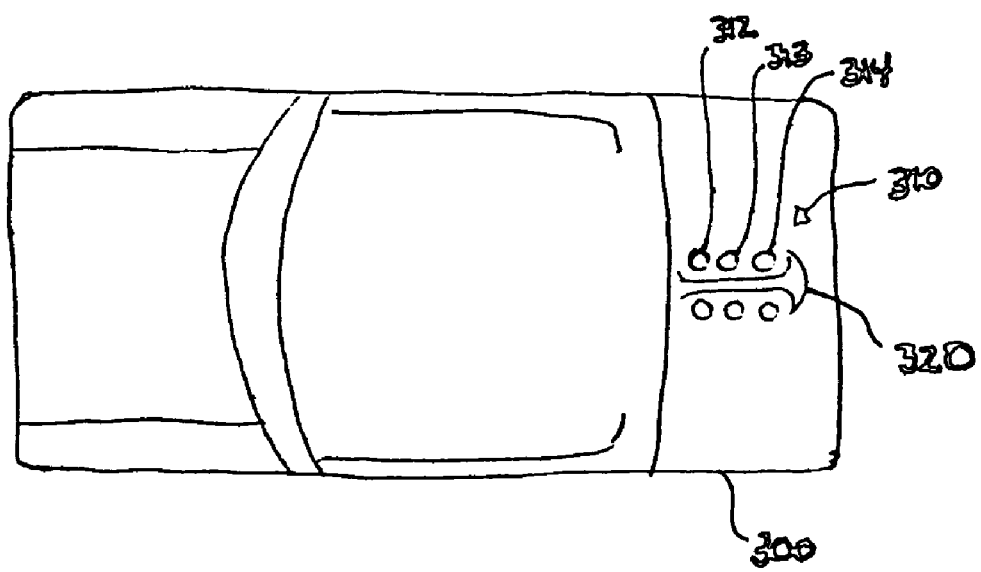
FIG. 3 is atop plan view of a racecar equipped with a position indicator according to another embodiment of the present invention.
Figure 4:
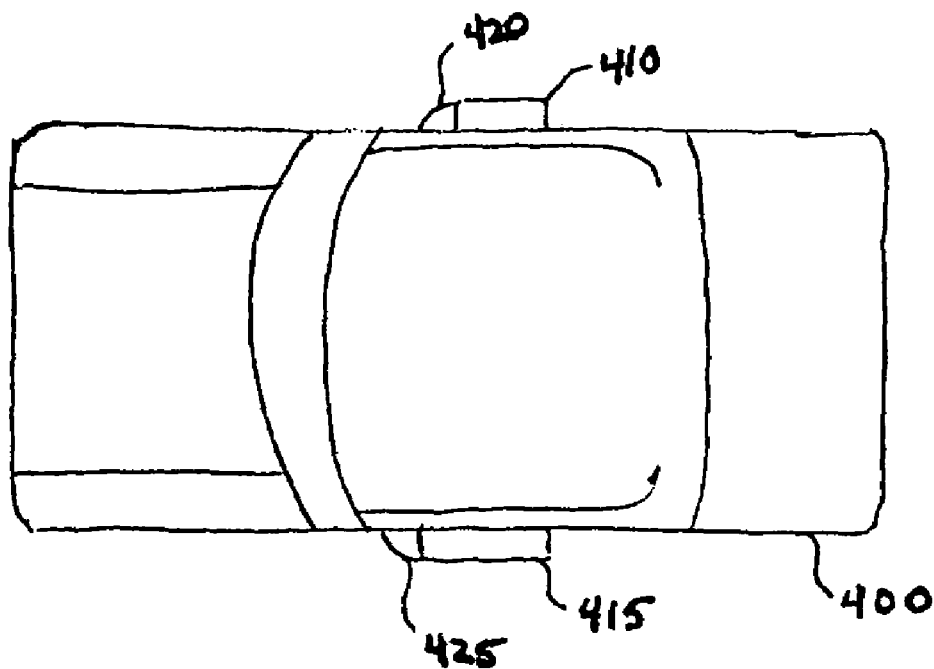
FIG. 4 is a top plan view of a racecar equipped with a position indicator according to an alternate embodiment of the present invention.
Figure 5:
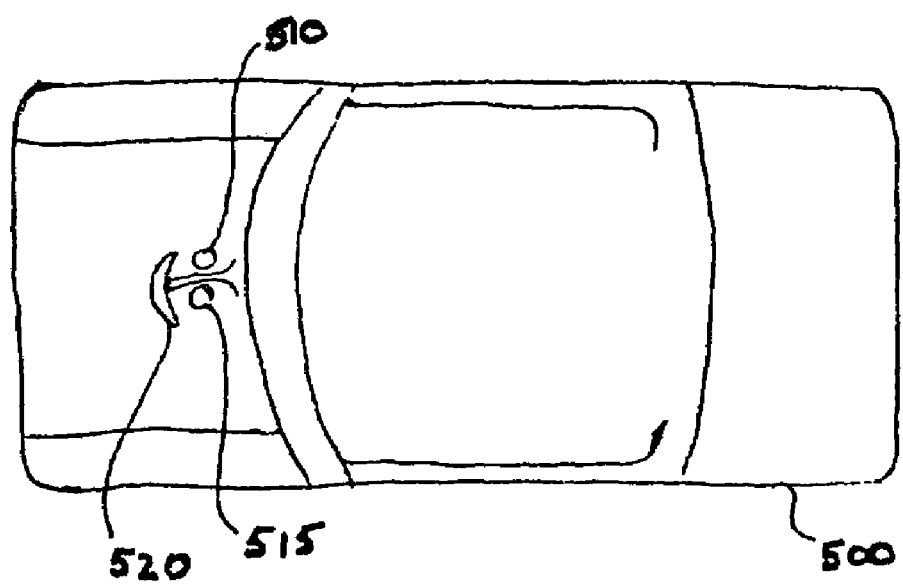
FIG. 5 is a top plan view of a racecar equipped with a position indicator according to another embodiment of the present invention.

FIGS. 2–5 show a variety of possible configurations of visual indicators. These are only a few examples of possible configurations of visual indicators according to the present invention. Other configurations are also contemplated. FIG. 2 shows a single-light system where each light 210, 215 is only visible from a single side of the car 200 due to the shape of a wind deflector 220. FIG. 3 shows a light bank system where a bank 310 of three lights 312, 313, 314 is visible from each side of the car 300. This particular example also uses a wind deflector 320 to reduce drag. FIG. 4 shows a car 400 equipped with display screens 410, 415 and wind deflectors 420, 425 on each door. In FIG. 5, a single-light system is shown on the hood of the car 500. Only one light 510, 515 is visible from each side of the car because of a wind deflector 520.

Figure 6:
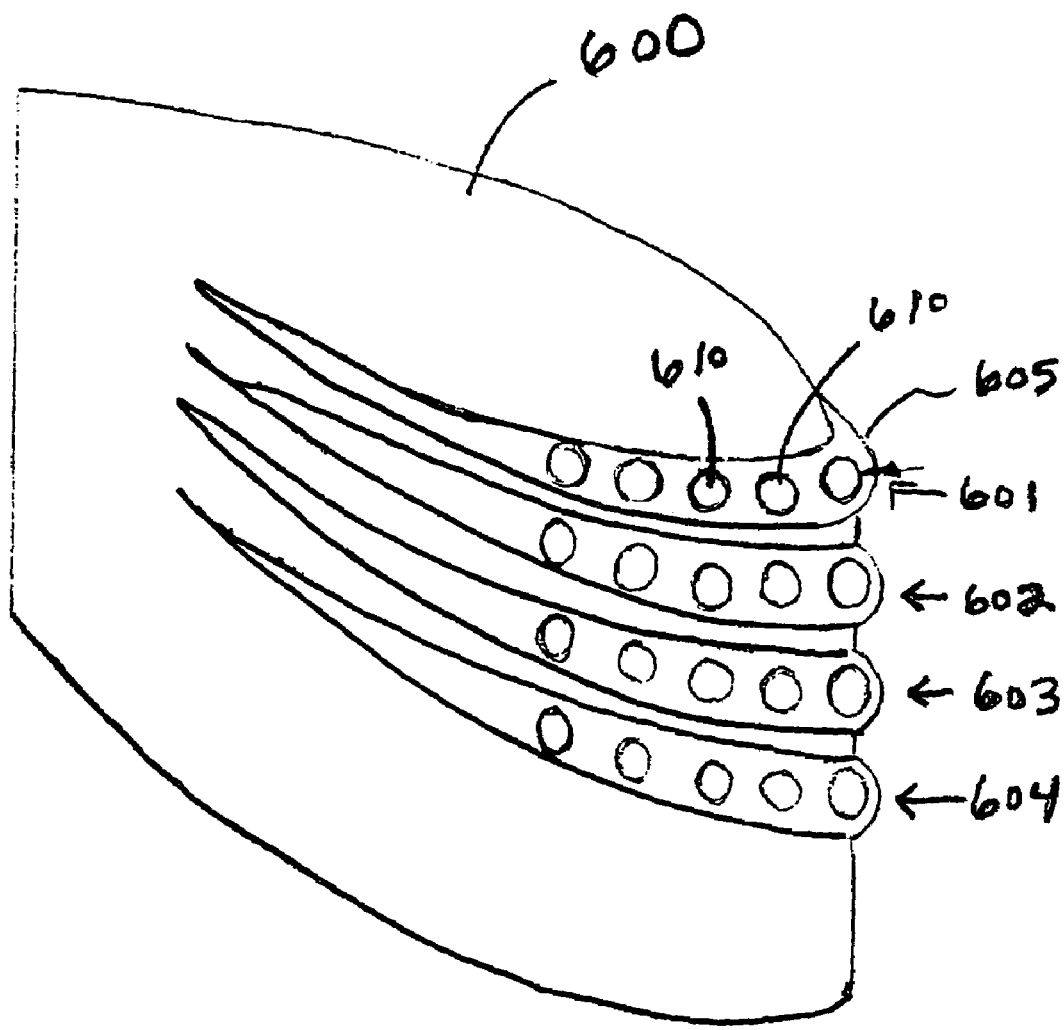
FIG. 6 is a front perspective view of an aerodynamic fin incorporating position indicating lights.

FIG. 6 depicts an indicating unit comprising an aerodynamic fin 600 having a curved leading surface and a tapered trailing edge. A plurality of banks of lights 601–604 are positioned around the leading surface with each bank being of a different color. These banks are composed of linear arrays of LEDs 610 beneath a protective covering 605, such as a lens, diffuser, partial shield or the like. This covering 605 can be a layer of clear acrylic. Suitable LEDs may be obtained from Lumileds Lighting, San Jose Calif., for example their LUXEON line of LEDs.

The fin 600 can be mounted on a racecar with the leading edge generally vertically extending, preferably within about 15° of the vertical. Each of the banks of lights 601–604 includes one center LED positioned at the leading edge and an equal number of LEDs on either side, in this case four on each side. In other variations there might be between 3–10 LEDs of a given color on each side in each bank of lights. LEDs can be positioned on the fin 600 in the form of linear arrays, arranged vertically, horizontally or any other angle, or the arrays of LEDs can be configured in any useful pattern, such as concentric circles or zigzags. Useful dimension of the fin 600 are between 4–8 inches in height and length and under 2 inches thick. The fin 600 could also be mounted horizontally or at a different angle on a car so long as it was aerodynamically positioned.

In one implementation, depicted in FIG. 7, this fin 600 also serves as a camera pod of an open wheel racecar. When implemented as a camera pod, the fin 600 would also contain a television camera and associated transmission equipment (or it may be a dummy pod provided to make the cars equal) and the fin 600 is positioned so as to provide an onboard view of the race to the television viewers. A typical placement for the camera pod in open wheel racing is behind the driver's cockpit 650 and above the driver, and in this position, the camera pod is the highest point in the car.

Referring now to FIG. 8, the lights 601–604 are configured to direct light to maximize visibility for the spectators yet minimize any distraction to the other drivers. This can be accomplished by directing the lights on the side of the fin 600 upwardly, for example along an axis greater than about 5–15° of horizontal, for example between about 5° and 25° of the track surface. Different angles are contemplated depending on the track orientation and the position of the spectators. The lights on either side of the car need not be positioned at the same angle. For example, when the track is banked, the inside lights may be at a greater angle than the outside lights.

Figure 9:
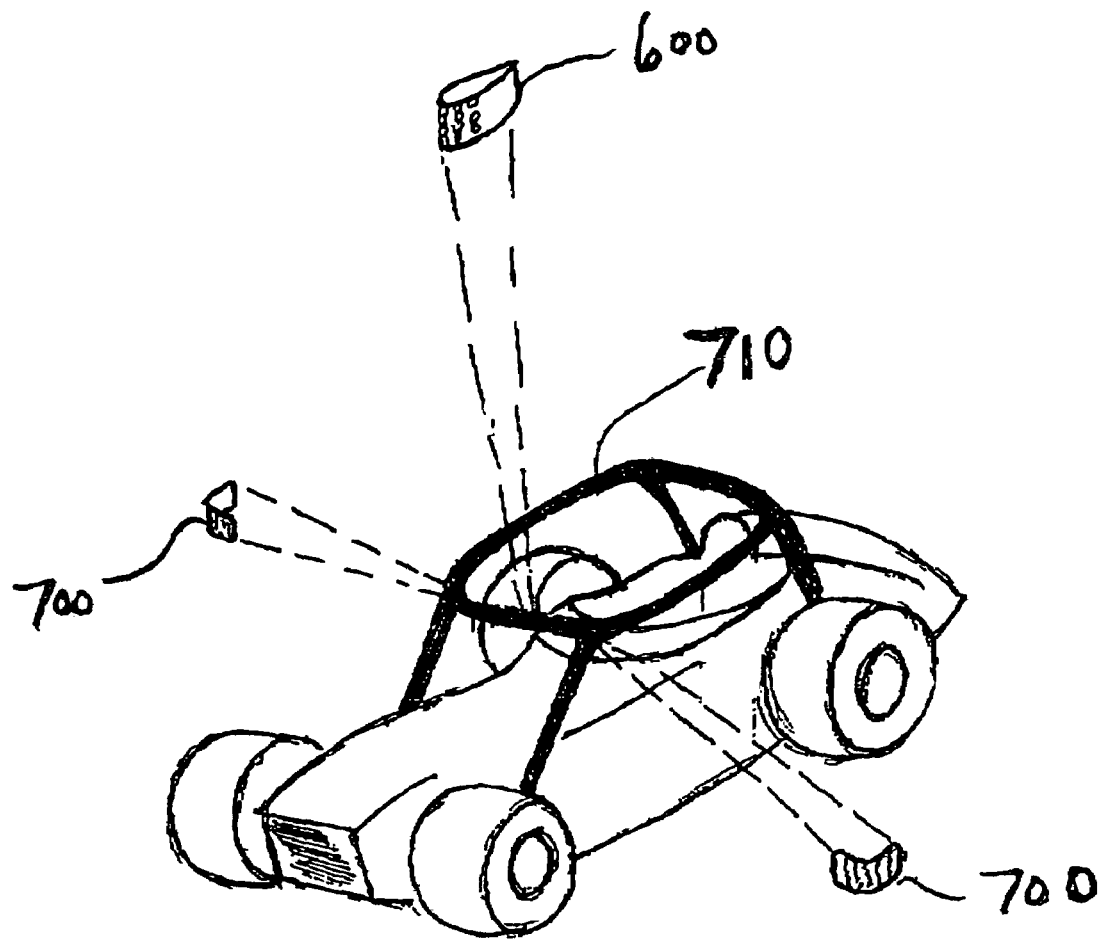
FIG. 9 is a perspective view of a racecar with the position indicators on the roll cage according to another embodiment of the invention.

While a camera pod provides an suitable location for certain types of racecars, an external roll cage may serve as the location for the position indicating unit in other types of racecars. For example, a open wheel racecar having an exposed rollcage 710 is depicted in FIG. 9 with the fin 600 of FIG. 6 mounted on the front center of the rollcage 710 and indicating units 700 mounted on the front corners of the rollcage 710 to provide a display to the front and to one side of the car.

Figure 10:
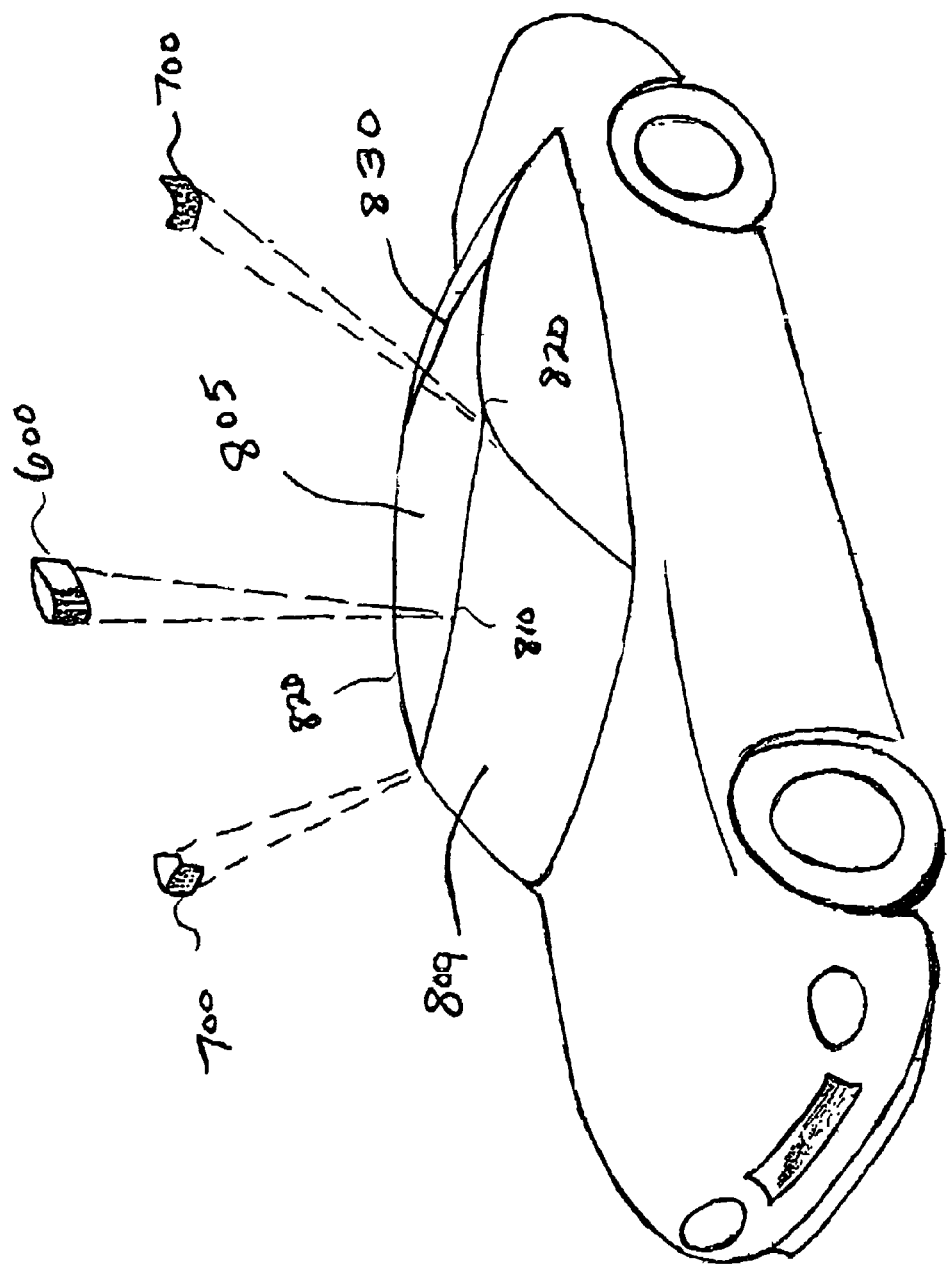
FIG. 10 is perspective view of a racecar with the position indicators on the roof according to another embodiment of the invention.

In still other types of racing, where a car has a roof covering the driver, indicating lights might be mounted to the roof of a car. FIG. 10 depicts an exemplary racecar having a roof 805 with a front edge 810 and an opposing rear edge 830 and a pair of spaced side edges 820. In this embodiment, the position indicating lights are positioned towards the front edge of the roof, with a fin 600 centered on the roof and units 700 near the corners, for example within about 10 inches of the front 810 and side 820 edges.

As described above, the present invention can be implemented with position information determined by ;the existing electronic timing system of the racetrack. In this implementation, the race track and the racecars are equipped with appropriate sensors for automatically monitoring position and relaying the information to a central computer system maintained by the race organizers. For example, U.S. Pat. No. 5,241,487 to Bianco depicts one such electronic track timing system utilizing optical sensors. Alternatively or in addition, manual spotters can provide the position information to be transmitted to the racecars via the transmission units of the present invention.

It is to be understood that a variety of systems also currently exist for transmitting information to racecars during the race, and the present invention can be implemented utilizing some of this existing equipment. For example, the Indianapolis Motor speedway employs a system during the Indianapolis 500 to remotely control a caution light in the cockpit of each racecar so as to provide a warning to the drivers of caution situations. This system could also be used to send coded signals to each car to control the position indicating units of the present invention.

While the indicating units can be used to indicate the position of certain racecars, additional uses are envisioned to enhance the spectators' experience. For example, one of the colors of the lights, or a particular pattern could be used to call attention to a particular racecar during the race. For example, when the track announcer makes a comment about a particular racecar or driver, such as a strong movement from behind, mechanical difficulty, or an interesting anecdote, that car's lights could be made to blink so that the spectators can easily identify the racecar. In a preferred form, there are at least four different visual indications available: the first three correspond to first place, second place, and third place, and the fourth visual indication is the wildcard used to point out a particular driver of interest during the race.

For this and other implementations of the invention, any chosen pattern of lights or colors can be used to communicate position and/or other information to the spectators provided the chosen pattern is communicated to the spectators. The public address system of the track or printed instructions provided on the back of tickets or in programs available at the track might be used for this purpose.

While the invention has been illustrated and described in detail in the drawings and foregoing description, the same is to be considered as illustrative and not restrictive in character, it being understood that only the preferred embodiment has been shown and described and that all changes, modifications and equivalents that come within the spirit of the inventions disclosed are desired to be protected. The articles "a", "an", "said" and "the" are not limited to a singular element, sand include one or more such element. Further, it is to be understood that, unless otherwise indicated in the claims, the terms first and second are used generically as identifiers and not to indicate any particular positions in a race.

What is claimed is:

1. A system for indicating race position to spectators of a race comprising:
   at least one light on each of a plurality of race participants, wherein the at least one light is constructed and arranged to be visible from the front of the respective race participant and to provide predetermined visual displays of different colors to indicate race positions to spectators of the race;
   a receiver associated with each of the race participants for receiving a transmitted signal indicating race position; and a controller operable to select one of the visual displays based on a signal from the receiver.

2. The system of claim 1 wherein the at least one light is a plurality of LEDs.

3. The system of claim 2 wherein the at least one light comprises a plurality of linear arrays of similar colored LEDs.

4. The system of claim 1 wherein the at least one light is positioned on the camera pod of an open wheel racecar.

5. The system of claim 1 wherein the at least one light is mounted to a roll cage of a racecar.

6. The system of claim 1 wherein the race participants are racecars with a roof having a front edge adjacent a front windshield, an opposing rear edge, and a pair of spaced side edges, wherein the at least one light is positioned on the roof substantially nearer the front and side edges than the rear edge.

7. The system of claim 6 wherein the at least one light is within about 10 inches of both the front edge and a side edge of the roof.

8. The system of claim 1 wherein the at least one light is configured to direct light along an axis inclined at least about 5 degrees relative to the local surface of the racecourse adjacent the respective race participant.

9. A system for visual indication of race positions comprising:
    a position indicating unit on each of a plurality of race participants, the position indicating units each including a visual indicator, a control unit and a receiver;
    wherein the visual indicators are constructed and arranged to be visible from the front of the respective race participant and to display to spectators of the race one of a plurality of different colors to represent relative race position; and
    wherein the control units are constructed and arranged to select a predetermined one of the plurality of colors for display based on a signal from the respective receiver.

10. The system of claim 9 wherein the visual indicator is a plurality of LEDs.

11. The system of claim 10 wherein the visual indicator comprises a plurality of linear arrays of similar colored LEDs.

12. The system of claim 9 wherein the visual indicator is positioned within about 5 inches of the highest portion of the race participant.

13. The system of claim 9 wherein the visual indicator is integrated into an aerodynamic fin mounted on the race participant.

14. An improvement to racing wherein spectators watch race participants navigate a racecourse while the relative position of the race participants is monitored, the improvement comprising:
    providing each of a plurality of race participants with a receiver and an associated indicating unit, wherein the indicating unit is positioned to be visible from the front of the respective race participant during the race;
    transmitting a signal to at least one of the receivers; and
    in response to the transmitted signal, activating the associated indicating unit to visually indicate to the spectators the relative position of a race participant by displaying light of a preselected color.

15. The improvement of claim 14 wherein the race organizers transmit the relative position to the position indicating units substantially in real time.

16. The improvement of claim 14 further comprising shielding the light from the position indicating unit of one race participant from the view of another second race participant behind the first participant.

17. The improvement of claim 14 further comprising shielding the light from the position indicating unit of the first race participant from the view of a second race participant passing the first race participant.

18. The improvement of claim 14 wherein the indicating unit includes a plurality of LEDs.

19. The improvement of claim 18 wherein light from the indicating units is directed along an axis inclined at least about 10 degrees relative to the local surface of the racecourse.

20. A method for indicating race position to spectators during a race comprising:
    monitoring race position of a plurality of race participants as spectators watch the race participants navigate a racecourse;
    transmitting signals representing race position to the race participants, and
    in response to the transmitted signal and with a position indicating unit carried by a race participant during the race, indicating the position of the race participant to the spectators by displaying light of a preselected color;
    wherein the light is visible from the front of the respective race participant.

21. The method of claim 20 wherein the position indicating unit includes a plurality of linear arrays of LEDs.

22. The method of claim 21 wherein the linear arrays are generally horizontal.

23. The method of claim 20 further comprising associating a selected race participant with information presented over a public address system of the racecourse by visually indicating the race participant to the spectators with the position indicating unit.

24. The method of claim 20 wherein the position indicating units are configured for use on different race participants in different races, the method further comprising removing a position indicating unit from a race participant after the race and mounting the position indicating unit to a different race participant.

25. The method of claim 20 wherein the indicating is near the upper corners of a windshield of the race participants.

26. The method of claim 20 wherein the indicating is from a camera pod of a racecar.

27. The method of claim 20 wherein the indicating is from a roll bar of a racecar.

28. The system of claim 1 wherein the at least on light is provided on an aerodynamic fin extending generally vertically from a surface of the racecar.

29. The system of claim 28 wherein the fin extends between 4 and 8 inches from the surface.

30. The system of claim 29 wherein the at least one light includes at least four parallel linear arrays of LEDs.

31. The system of claim 30 wherein each array of LEDs is a different color.

32. The system of claim 1 wherein at least one light is constructed and arranged to selectively provide at least four different predetermined visual displays to the spectators, wherein three of the displays indicate the top three race positions and the fourth selectively indicates a race participant of interest to the spectators.

33. The system of claim 9 wherein the visual indicators are constructed and arranged to indicate the top three race positions and to selectively indicate a fourth race participant of interest to the spectators.

* * * * *